United States Patent
Tanaka et al.

(10) Patent No.: US 6,239,253 B1
(45) Date of Patent: May 29, 2001

(54) DEPROTEINIZED NATURAL RUBBER AND PROCESS FOR PRODUCING THE SAME

(75) Inventors: Yasuyuki Tanaka, Tokyo; Yuichi Hioki, Wakayama; Naoya Ichikawa, Hyogo, all of (JP)

(73) Assignees: KAO Corporation, Tokyo; Sumitomo Rubber Industry Company, Ltd., Hyogo, both of (JP)

( * ) Notice: Subject to any disclaimer, the term of this patent is extended or adjusted under 35 U.S.C. 154(b) by 0 days.

(21) Appl. No.: 09/356,523

(22) Filed: Jul. 19, 1999

Related U.S. Application Data

(62) Division of application No. 08/799,363, filed on Feb. 14, 1997, which is a continuation of application No. 08/416,460, filed on Apr. 3, 1995, now abandoned, which is a continuation of application No. 08/099,431, filed on Jul. 30, 1993, now abandoned.

(30) Foreign Application Priority Data

| Aug. 5, 1992 | (JP) | 4-208754 |
| Aug. 5, 1992 | (JP) | 4-208755 |
| Aug. 5, 1992 | (JP) | 4-208756 |
| Aug. 5, 1992 | (JP) | 4-208757 |
| Aug. 5, 1992 | (JP) | 4-208758 |

(51) Int. Cl.⁷ ................................... C08C 1/04
(52) U.S. Cl. ................. 528/494; 528/491; 528/932
(58) Field of Search ....................... 528/932, 930

(56) References Cited

U.S. PATENT DOCUMENTS

| 1,947,949 | 2/1934 | Miedel . |
| 2,097,481 | 11/1937 | Wallerstein . |
| 2,116,089 | 5/1938 | Wallerstein . |
| 2,123,862 | 7/1938 | Broeck . |
| 2,367,120 | * 1/1945 | Hessels ........................... 528/932 |
| 3,632,563 | 1/1972 | Wakefield . |

FOREIGN PATENT DOCUMENTS

| 1366934 | 9/1974 | (GB) . |
| 2179355 | 3/1987 | (GB) . |
| 2098222 | 11/1992 | (GB) . |

OTHER PUBLICATIONS

Elvig, "Treatment of Latex", *Research Disclosure* (335):223 (Mar. 1992).

Polymer Latex III: PRI International Conference, London 27–29 Jun. 1989.

Research Disclosure, Mar. 1992/223, 335102, Treatment of Latex.

* cited by examiner

*Primary Examiner*—Christopher Henderson
(74) *Attorney, Agent, or Firm*—Sughrue, Mion, Zinn, Macpeak & Seas, PLLC

(57) ABSTRACT

A deproteinized natural rubber substantially free from any protein and a process for producing the same which comprises treating a latex with a protease and a specific surfactant or a combination of specific surfactants and separating rubber particles are disclosed. A method for elevating the green strength of a natural rubber and a method for lowering the green strength of a natural rubber are also disclosed. Furthermore, a means for preventing allergy induced by natural rubber is also disclosed.

5 Claims, 3 Drawing Sheets

(a) Example 1

(b) Comparative Example 1

(c) Comparative Example 2

DEPROTEINIZED NATURAL RUBBER AND PROCESS FOR PRODUCING THE SAME

This is a divisional of application Ser. No. 08/799,363 filed on Feb. 14, 1997, which is a continuation of application Ser. No. 08/416,460, filed Apr. 3, 1995, now abandoned, which is a continuation of application Ser. No. 08/099,431 filed Jul. 30, 1993, now abandoned.

FIELD OF THE INVENTION

This invention relates to a deproteinized natural rubber which is substantially free from any protein and a process for producing the same.

The present invention furthermore relates to a method for elevating the-green strength of natural rubber.

The present invention still further relates to a method for lowering the green strength of natural rubber.

The present invention still furthermore relates to the prevention of allergy induced by natural rubber.

BACKGROUND OF THE INVENTION

Natural rubber has been widely employed in industrial articles such as automobile tires, belts and adhesives and domestic articles such as gloves.

In addition to its excellent mechanical properties as vulcanized rubber, natural rubber is much superior in the raw rubber strength (green strength) to synthetic rubber. Accordingly, natural rubber is excellent in processing characteristics in kneading, sheeting and various molding procedures. In the form of a latex, natural rubber has a high gel strength at solidification and thus can be easily formulated into a film, which makes the natural rubber applicable to various products including condoms, surgical gloves and diverse catheters.

This natural rubber is obtained as Hevea tree sap which is in the form of a latex containing rubber components together with water, proteins and inorganic salts. A green latex obtained by tapping Hevea trees is collected in cups and combined together. Then it is solidified in a refining plant to thereby give a raw rubber (i.e, a crepe rubber or a smoked sheet rubber). Alternately, the green latex is concentrated by centrifuging to thereby give a refined latex. During these processes, ammonia is usually added to the latex in order to inhibit the progress of putrefaction due to the bacteria contained in the green latex and to prevent the latex from solidification. In recent years, attempts have been made to prevent the putrefaction by previously adding a small amount of zinc oxide and tetramethylthiuram disulfide to the cups into which the green latex is to be collected. In each rubber farm, the green latex collected in the cups is combined and a small amount of ammonia is further added thereto, followed by transporting to a refining plant. In the refining plant, the green latex is diluted with water, solidified by using formic acid and dried into raw rubber. Alternately, the green latex is adjusted to an ammonia concentration of 0.5%, separated from the latex serum by centrifuging, concentrated and formulated into a high-ammonia latex of an ammonia concentration of 0.7% so as to prevent the putrefaction and to mechanically stabilize or to a low-ammonia latex of an ammonia concentration of 0.2% and containing a small amount of tetramethylthiuram disulfide, followed by shipping.

The rubber components in the natural rubber latex are solidified to thereby give a raw rubber (a crepe rubber or a smoked sheet rubber) which is then subjected to mastication, blending with additives, molding and vulcanization to thereby give the aimed rubber products.

Mastication means a treatment whereby a shear force is applied to the latex to thereby loosen molecular aggregates and cleave molecular chains, thus reducing the molecular weight. In order to accelerate the occurrence of these reactions, loosening agents are sometimes used. Thus the elasticity of the rubber is lowered and the rubber becomes plastic, which makes the processing operations following the blending step easy.

In general, the plasticity of unvulcanized rubber is expressed in Mooney viscosity. A higher Mooney viscosity means the higher elasticity and the lower plasticity of the rubber. on the contrary, a rubber of a low Mooney viscosity has a low elasticity and a high fluidity, which makes it easy to process the rubber. In practice, a high Mooney viscosity results in a large extrusion torque in, for example, the subsequent extrusion step. As a result, the extrusion speed decrease, which lowers the production efficiency. In addition, the large extrusion torque causes the accumulation of the energy in the rubber. Consequently, the rubber becomes hot and, in its turn, undergoes scorching. It has been known that the addition of an oil would lower the Mooney viscosity of rubber. However, it is impossible in some cases to use any oil. Accordingly, there has been required to provide a natural rubber of excellent processing characteristics.

On the other hand, it has been recently reported in United States that medical instruments with the use of natural rubber such as surgical gloves, various catheters and anesthetic masks cause dyspnoea or anaphylactoid symptoms (for example, angioedema, urticaria, collapse, cyanosis). It has been also reported that female patients with allergic anamnesis suffered from hand ache, urticaria and angioedema around eyes due to the use of household natural rubber gloves.

Accordingly, it has been required to develop measures against such problems.

The reduction in the content of non-rubber components in natural rubber contributes to the lowering of the water absorptivity of the natural rubber and to the improvement in the electrical characteristics (for example, electrical insulation properties) of natural rubber products. By almost completely eliminating non-rubber components, an advantageous material for producing rubber products, which suffer from little energy loss and have excellent mechanical properties, improved crepe characteristics and improved aging resistance, can be provided. It is one of serious disadvantages of natural rubber that the material properties vary depending on the production area and production time, which is a problem characteristic of natural products. Therefore, the elimination of the non-rubber components causing this problem makes the vulcanizing characteristics stable. Thus the natural rubber becomes a material rubber having stable qualities comparable to synthetic rubbers. Thus the mechanical accuracies of natural rubber products can be elevated.

Known methods for reducing the non-rubber component content in natural rubber comprise thoroughly washing a latex with water. That is to say, there have been known methods therefor which comprise (i) aggregating rubber particles in a highly diluted latex; (ii) centrifuging a highly diluted latex and separating the latex thus concentrated; or (iii) dialyzing a latex.

Further, there have been known other methods for reducing the non-rubber component content in natural rubber which comprise (a) decomposing the non-rubber components with bacteria or enzymes; (b) adding alkali to a latex and heating the obtained mixture to thereby decompose the non-rubber components; or (c) liberating non-rubber components adsorbed by rubber particles with the use of soaps.

In practice, deproteinized natural rubbers are produced by combining some of these methods with each other. Examples of such deproteinized natural rubbers are as follows.

(1) Crepe H:

A small amount of ammonia is added to a latex to thereby make the pH value of the latex 7.1, followed by stirring for 6 to 48 hours. During the stirring procedure, proteins are decomposed by bacteria and enzymes contaminating the latex after collecting the sap. In this case, the solidified product which is preliminarily formed is removed and then the decomposition product is eliminated by centrifuging or creaming. Next, the solidified product is formulated into a crepe.

(2) Crepe G:

To a latex stabilized with ammonia, a soap or other surfactant(s) are added to thereby adsorb proteins. Then salts and proteins are eliminated from the latex by repeatedly centrifuging. Next, the latex is highly diluted and solidified to thereby give a crepe.

(3) Crepe CD:

In this case, a fresh-solidified product before rolling is immersed in running water and thus proteins are decomposed. After separating by dialysis, the product is formulated into a crepe.

On the other hand, there has been proposed an improved deproteinized natural rubber which is produced by lowering the ammonia concentration of a concentrated latex preserved-in the presence of ammonia to 0.2%, adding 0.4 phr (parts per hundred) of ammonium naphthenate as a preservative, carrying out the enzyme reaction for 20 hours by adding 0.25 phr of superase (a protease), then diluting the latex and solidifying the same with phosphoric acid, as disclosed in *Tennen Gomu* (natural rubber), vol. 6, No. 8, 274–281 (1974).

The protein content of a natural rubber is generally expressed in an amount corresponding to 6.3 times as much as its nitrogen content (N %) which is determined by Kjeldahl method. The protein content of a fresh natural rubber latex (field latex) ranges from about 3 to 5% by weight (about 0.5 to 0.8 as N %) based on solid matters (rubber particles). The protein contents of a marketed refined latex and raw rubber (smoked sheet rubber) are about 2% by weight (about 0.3 as N %) or above. Although the protein contents of the above-mentioned deproteinized natural rubbers are remarkably lowered compared with these marketed natural rubbers, the N % of the crepe CD is 0.11 while that of the deproteinized natural rubber obtained by the latter improved method is 0.06. Thus none of them is completely deproteinized and, therefore, satisfactory as a material for solving the above problems.

SUMMARY OF THE INVENTION

The present invention provides a deproteinized natural rubber which is obtained by eliminating proteins and other impurities from natural rubber and useful as a novel material having a good electrical insulation property, suffering from a small energy loss and being excellent in processing characteristics, mechanical properties and colorless and transparent appearance.

The present invention further provides a process for producing a deproteinized natural rubber which comprises treating a latex with a protease and a specific surfactant or a combination of specific surfactants.

The present invention furthermore provides a method for elevating the green strength of a natural rubber which comprises adding ammonia to a field latex, aging the mixture and then treating the same with a protease and a specific surfactant or a combination of specific surfactants.

The present invention still further provides a method for lowering the green strength of a natural rubber which comprises treating a field latex with a protease and a specific surfactant or a combination of specific surfactants.

The present invention still furthermore provides a means for preventing allergy induced by natural rubber.

DETAILED DESCRIPTION OF THE INVENTION

Figure 1:
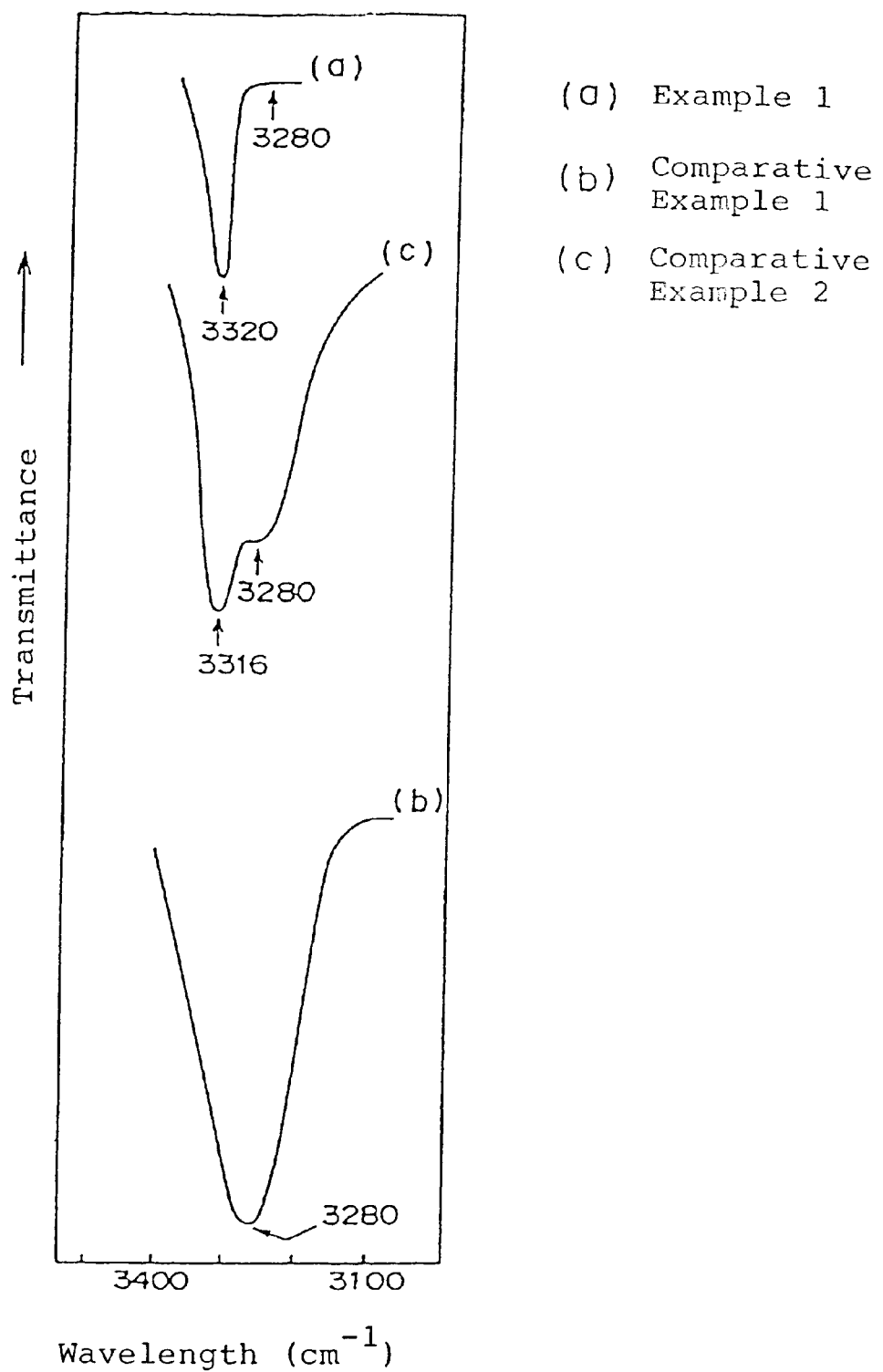
FIG. 1 is a graph which shows the infrared absorption spectra of the deproteinized natural rubbers obtained in Example 1 and Comparative Examples 1 and 2.

The deproteinized natural rubber of the present invention is substantially free from any proteins and characterized in that proteins contained in a raw rubber obtained from a natural rubber latex have been eliminated to a level of a nitrogen content of less than 0.02%.

It is generally known that natural rubber is a mixture of high molecular weight components of 1,000,000 to 2,500,000 in molecular weight and low molecular weight components of 100,000 to 200,000 therein. It is assumed that the low molecular weight components are bound to each other via abnormal groups contained in the natural rubber and branched, thus forming the high molecular weight components. When an amino acid molecule (i.e., a nitrogen atom of an atomic weight of 14) is bound to one molecule of a low molecular weight rubber of a molecular weight of 100,000 which has been seemingly formed by the inherent biosynthesis, the nitrogen content becomes 0.014%. It is, therefore, considered that the nitrogen content corresponding to this amount is not eliminated but remains. Accordingly, it is understood that a natural rubber from which proteins have been eliminated to a level of a nitrogen content of 0.014% has been completely deproteinized. However, the molecular weight of natural rubber is generally distributed as described above, so that it is regarded that a natural rubber from which proteins have been eliminated to a level of a nitrogen content of less than 0.02% has been completely deproteinized.

The deproteinized natural rubber of the present invention is also characterized in that proteins have been eliminated to such a level that it does not give an absorption at 3280 $cm^{-1}$ in the infrared absorption spectrum, which is characteristic to polypeptides, when measured in the form of a raw rubber film.

As described above, the protein content of a natural rubber can be estimated on the basis of its nitrogen content. However, studies on the infrared absorption spectra of deproteinized and refined rubbers by the present inventors have revealed that the protein content of a highly deproteinized natural rubber estimated based on its nitrogen content is not perfectly accurate. This is because there are proteins binding to rubber molecules and thus amino acids or short chain peptide molecules remain at the binding parts to rubber molecules even after the completion of the hydrolysis by enzymatic reaction. However, the allergic actions due to proteins are caused exclusively by high molecular weight polypeptides and xthus the amino acids and short chain peptide molecules never result in any problem relating to allergy.

In order to more exactly confirm that proteins have been eliminated, it is preferable to employ an analytical technique with the use of infrared absorption spectrum which has been developed by the present inventors. That is to say, the present inventors measured infrared absorption spectra of natural rubber refined at various levels with the use of a Fourier transform infrared spectrometer. The results thus obtained were discussed by comparing the infrared absorption spectra of peptides reported by Naumann et al. (as disclosed in Biopolymers, 26, 795). Consequently, it has been clarified that after eliminating proteins, an absorption at 3280 $cm^{-1}$ assignable to polypeptides disappears, though an absorption at 3315 to 3320 $cm^{-1}$ assignable to the group of >N-H in short-chain peptides or amino acids binding to rubber molecules remains. Accordingly, the deproteinized natural rubber of the present invention is natural rubber which has been refined preferably to such a level that the infrared absorption spectrum of its film shows no absorption at 3280 $cm^{-1}$.

No such a natural rubber as the one according to the present invention, from which proteins have been almost completely eliminated, has been obtained hitherto. This deproteinized natural rubber, which is substantially free from any protein, is not only useful as a countermeasure to the allergic reactions but also expected to be usable as a material for providing highly refined products of good qualities having characteristics different from common natural rubber (for example, low water absorptivity, electrical properties, low hysteresis loss, colorless and transparent appearance) and suffering from no lot-to-lot variation characteristic to natural materials.

In addition, natural rubber tends to be hardened during storage period (i.e., storage hardening), which makes mastication for plasticizing necessary prior to the use. It has been found out, however, that a natural rubber from which proteins have been completely eliminated would never undergo this phenomenon.

Accordingly, the deproteinized natural rubber of the present invention has a low Mooney viscosity and excellent processing characteristics. By using this deproteinized natural rubber, therefore, a rubber composition having a low Mooney viscosity, a high strength and an improved tear resistance can be obtained. In particular, the deproteinized natural rubber of the present invention has a lower Mooney viscosity than a masticated rubber to which a loosening agent has been previously added. Thus the deproteinized natural rubber of the present invention requires no mastication, which is highly advantageous from the viewpoint of the processing.

An additional disadvantage of natural rubber resides in that it is colored and the coloration becomes more conspicuous with the lapse of time, since it contains carotenoid which is a polyene having an isoprene structural unit and a number of conjugated double bonds. However, these carotenoid impurities are eliminated during the process for reducing proteins. Consequently, a natural rubber comparable to synthetic ones in the transparent and colorless appearance can be obtained.

The deproteinized natural rubber of the present invention can be obtained by treating a latex with a protease and a specific surfactant or a combination of specific surfactants and separating rubber particles (the rubber component).

The treatment of the latex with the protease and the surfactant may be carried out by adding the protease and the surfactant(s) to the latex so as to contact the protease and the surfactant(s) with rubber particles for a sufficient period of time.

The protease and the surfactant(s) may be added to the latex simultaneously, or the protease may be added first to the latex and then the surfactant(s) may be added to the latex mixture during or after the completion of the treatment of the latex with the protease. Alternatively, the surfactant(s) may be added first to the latex and then the protease may be added to the latex. Further, the surfactant(s) may be added at the separation step of the rubber particles to carry out the treatment with the surfactant and the separation simultaneously. Furthermore, in the case where the protease and the surfactant(s) are added simultaneously, they may be mixed with each other in advance to prepare a composition and the treatment of the latex may be carried out by adding the composition.

In the treatment of the latex with the protease and/or the surfactant(s), the latex may be stirred or allowed to stand without stirring. When the latex is stirred, stirring is carried out in an extent that the latex do not cause foaming or the enzymatic reaction of the protease is not prevented.

In the treatment of the latex with the protease, the temperature of the latex may be controlled if necessary. In general, the temperature of the latex is controlled to at from 5 to 90° C., preferably at from 20 to 60° C., more preferably at the optimum temperature of the protease employed. When the temperature is higher than 90° C., the protease tends to be deactivated quickly, while when the temperature is less than 5° C., the enzymatic reaction of the protease hardly proceeds.

The period of time for the treatment of the latex with the protease and the surfactant(s) is not specifically restricted and may be determined depending on factors in the treatment such as the content of proteins in the latex, the kind and the amount of the protease, the kind and the amount of the surfactant(s). However, it is preferred that the treatment is carried out for a period of time of from several minutes to about one week from the addition of the protease. In this instance, if necessary, the completion of deproteinizing reaction is confirmed by sampling the latex and measuring the protein content in the latex.

After the afore-mentioned treatment, the rubber particles are separated from the latex mixture in the separation step.

Separation of the rubber particles from the latex mixture may be carried out in a conventional separating method known in the art such as centrifugation, aggregation and membrane permeation. In the separation step, synthetic rubber particles or a synthetic rubber latex may be added to the latex mixture.

The separation step may be carried out for once or several times according to need. Further, the deproteinizing process comprising the treatment with the protease and the surfactant(s) and the separation may be carried out for several times if necessary.

The protease to be used in the present invention is not particularly restricted. For example, alkaline proteases are usable therefor. Although proteases originating in bacteria, fungi or yeasts may be used, it is preferable to use those originating in bacteria.

In the process for producing the deproteinized natural rubber according to the present invention, the protease is used in an amount of from 0.0001 to 20% by weight, preferably from 0.001 to 10% by weight, based on the rubber latex. When the amount of the added protease is smaller than 0.0001% by weight, no satisfactory effect can be achieved. When more than 20% by weight of the protease is used, the excessive amount of the protease elevates the production cost. In this case, furthermore, the activity of the enzyme is lowered.

As the surfactants to be used in the process for producing the deproteinized natural rubber according to the present invention, one of those as given hereinafter may be employed:

(1) a combination of one or more of an anionic surfactant with one or more of a nonionic surfactant;

(2) one or more of an anionic surfactant selected from the group consisting of sulfonic acid surfactants, sulfate surfactants and phosphate surfactants; and (3) one or more of a nonionic surfactant selected from the group consisting of polyoxyalkylene ester surfactants, polyhydric alcohol fatty acid ester surfactants, sugar fatty acid ester surfactants, alkylpolyglycoside surfactants, and polyoxyalkylene polyhydric alcohol ether surfactants may be used as the nonionic surfactants.

As to the surfactant (1), examples of the anionic surfactants include carboxylic acid surfactants, sulfonic acid surfactants, sulfate surfactants and phosphate surfactants.

Examples of the carboxylic acid surfactants include fatty acid salts, polyvalent carboxylates, rosinates, dimeric acid salts, polymeric acid salts and tall oil fatty acid salts, each having 6 to 30 carbon atoms. Among these surfactants, carboxylates having from 10 to 20 carbon atoms are preferable therefor. Surfactants having less than 6 carbon atoms are insufficient in the dispersion and emulsification of proteins and impurities, while those having more than 30 carbon atoms are hardly dispersible in water.

Examples of the above-mentioned sulfonic acid surfactants include alkylbenzenesulfonates, alkylsulfonates, alkylnaphthaltenesulfonates, naphthalenesulfonates and diphenyl ether sulfonates.

Examples of the sulfate surfactants include alkyl sulfate salts, polyoxyalkylene alkyl sulfate salts, polyoxyalkylene alkyl phenyl ether sulfates, tristyrenated phenol sulfate salt and polyoxyalkylene distyrenated phenol sulfate salts.

Examples of the phosphate surfactants include alkyl phosphate salts and polyoxyalkylene phosphate salts.

Examples of the salts of these compounds include metal salts (for example, Na, K, Ca, Mg, Zn salts), ammonia salts and amine salts (for example, triethanolamine salt).

As the nonionic surfactants, polyoxyalkylene ether surfactants, polyoxyalkylene ester surfactants, polyhydric alcohol fatty acid ester surfactants, sugar fatty acid ester surfactants and alkyl polyglycoside surfactants may preferably be employed.

Examples of the polyoxyalkylene ether nonionic surfactants include polyoxyalkylene alkyl ethers, polyoxyalkylene alkylphenyl ethers, polyoxyalkylene polyol alkyl ethers, polyoxyalkylene styrenated phenol ethers, polyoxyalkylene distyrenated phenol ethers and polyoxyalkylene tristyrenated ethers. Examples of the above-mentioned polyols include polyhydric alcohols having from 2 to 12 carbon atoms such as propylene glycol, glycerol, sorbitol, sucrose and pentaerythritol.

Examples of the polyoxyalkylene ester nonionic surfactants include polyoxyalkylene fatty acid esters.

Examples of the polyhydric alcohol fatty acid ester surfactants include fatty acid esters of polyhydric alcohols having from 2 to 12 carbon atoms and polyoxyalkylene polyhydric alcohol fatty acid esters. Specific examples thereof include sorbitol fatty acid esters, sorbitan fatty acid esters, fatty acid monoglycerides, fatty acid diglycerides and polyglycerol fatty acid esters. Furthermore, polyalkylene oxide-adducts of these compounds (for example, polyoxyalkylene sorbitan fatty acid esters, polyoxyalkylene glycerol fatty acid esters) are also usable therefor.

Examples of the sugar fatty acid ester nonionic surfactants include fatty acid esters of sucrose, glucose, maltose, fructose and polysaccharides. Furthermore, polyalkylene oxide adducts thereof are also usable.

Examples of the alkyl polyglycoside nonionic surfactants include alkyl glucosides, alkyl polyglucosides, polyoxyalkylene alkyl glucosides and polyoxyalkylene alkyl polyglucosides as well as fatty acid esters thereof. Furthermore, polyalkylene oxide adducts of these compounds are also usable therefor.

Examples of the alkyl groups in these surfactants include, for instance, those having from 4 to 30 carbon atoms. Examples of the polyoxyalkylene groups therein include, for instance, those containing alkylene groups having from 2 to 4 carbon atoms. For example, ethylene oxide of an addition mole number of from 1 to 50 mole may be cited therefor. Examples of the above-mentioned fatty acids include, for instance, straight-chain or branched, saturated or unsaturated fatty acids having from 4 to 30 carbon atoms.

In the process for producing the deproteinized natural rubber according to the present invention, the surfactants of the above-mentioned (1) may preferably be used in a total amount of from 0.001 to 20% by weight, more preferably from 0.01 to 10% by weight, based on the rubber latex.

As to the above-mentioned surfactants (2), examples of the sulfonic acid surfactants include alkylbenzenesulfonates, alkylsulfonates, alkylnaphthalene-sulfonates, naphthalenesulfonates and diphenyl ether sulfonates. Examples of the sulfate surfactants include alkyl sulfate salts, polyoxyalkylene alkyl sulfate salts, polyoxyalkylene alkylphenyl ether sulfates, tristyrenated phenol sulfate salts, distyrenated phenolsulfate salts, α-olefinsulfate salts, alkylsuccinic acid sulfate salts, polyoxyalkylene tristyrenated phenol sulfate salts and polyoxyalkylene distyrenated phenol sulfate salts. Examples of the phosphate surfactants include alkyl phosphate salts and polyoxyalkylene phosphate salts. Among them, salts of alkylbenzenesulfonic acids, alkyl sulfates, alkyl phosphates, polyoxyalkylene alkyl sulfates and polyoxyalkylene alkyl phosphates are preferred.

Examples of the salts of these compounds include metal salts (for example, Na, K, Ca, Mg, Zn salts), ammonium salts and amine salts (for example, triethanolamine salt).

Examples of the alkyl groups in these surfactants include, for instance, those having from 4 to 30 carbon atoms. Examples of the polyoxyalkylene groups therein include, for instance, those containing alkylene groups having from 2 to 4 carbon atoms. For example, ethylene oxide of an addition mole number of from 1 to 50 mole may be cited therefor.

In the process for producing the deproteinized natural rubber according to the present invention, the surfactants of the above-mentioned (2) may preferably be used in a total amount of from 0.001 to 20% by weight, more preferably from 0.01 to 10% by weight, based on the rubber latex.

As to the above-mentioned surfactants (3), examples of the polyoxyalkylene ester surfactants include polyoxyalkylene fatty acid esters.

Examples of the polyhydric alcohol fatty acid ester nonionic surfactants include fatty acid esters of polyhydric alcohols having from 2 to 12 carbon atoms and polyoxyalkylene polyhydric alcohol fatty acid esters. Specific examples thereof include sorbitol fatty acid esters, sorbitan fatty acid esters, fatty acid monoglycerides, fatty acid diglycerides and polyglycerol fatty acid esters. Furthermore, polyalkylene oxide-adducts of these compounds (for example, polyoxyalkylene sorbitan fatty acid esters, polyoxyalkylene glycerol fatty acid esters) are also usable therefor.

Examples of the sugar fatty acid ester nonionic surfactants include fatty acid esters of sucrose, glucose, maltose, fructose and polysaccharides. Furthermore, polyalkylene oxide adducts thereof are also usable.

Examples of the alkyl polyglycoside nonionic surfactants include alkyl glucosides, alkyl polyglucosides, polyoxyalkylene alkyl glucosides and polyoxyalkylene alkyl polyglucosides as well as fatty acid esters thereof. Furthermore, polyalkylene oxide adducts of these compounds are also usable therefor.

Examples of the polyhydric alcohol ether nonionic surfactants, and polyoxyethylene polyhydric alcohol alkyl ethers. Examples of the polyhydric alcohols include polyols having from 2 to 12 carbon atoms such as propylene glycol, glycerol, sorbitol, sucrose, pentaerythritol and sorbitan.

Examples of the alkyl groups in these surfactants include, for instance, those having from 4 to 30 carbon atoms. Examples of the polyoxyalkylene groups therein include, for instance, those containing alkylene groups having from 2 to 4 carbon atoms. For example, ethylene oxide of an addition mole number of from 1 to 50 mole may be cited therefor. Examples of the above-mentioned fatty acids include, for instance, straight-chain or branched, saturated or unsaturated fatty acids having from 4 to 30 carbon atoms.

In the process for producing the deproteinized natural rubber according to the present invention, the surfactants of the above-mentioned (3) may preferably be used in an amount of from 0.001 to 20% by weight, more preferably from 0.01 to 10% by weight, based on the rubber latex.

In the step of adding the enzyme, other additives may be used together. For example, phosphates such as dibasic potassium phosphate, monobasic potassium phosphate and sodium phosphate; acetates such as potassium acetate and sodium acetate; acids such as sulfuric acid, acetic acid, hydrochloric acid, nitric acid, citric acid and succinic acid and salts thereof; ammonia; sodium hydroxide; potassium hydroxide; sodium carbonate; and sodium hydrogencarbonate may be used as a pH controller. Furthermore, the protease may be used together with other enzymes such as lipase, esterase, amylase, laccase and cellulase.

Furthermore, dispersing agents such as styrene/sulfonic acid copolymers, naphthalenesulfonic acid/formalin condensates, ligninsulfonic acid, polycyclic aromatic sulfonic acid copolymers, acrylic acid and maleic anhydride homopolymers and copolymers, isobutylene/acrylic acid copolymers and isobutylene/maleic anhydride copolymers may be used together.

The latex to be used as a starting material for producing the deproteinized natural rubber according to the present invention means a field latex obtained from natural rubber trees. Either a marketed ammonia-treated latex or a fresh field latex may be used in the present invention.

It is generally known that natural rubber is a mixture of high molecular weight components of 1,000,000 to 2,500, 000 in molecular weight and low molecular weight components of 100,000 to 200,000 therein. It is assumed that the low molecular weight components are bound to each other via abnormal groups contained in the natural rubber and branched, thus forming the high molecular weight components.

Our studies have revealed that the rubber components in a field latex have a molecular weight distribution showing a relatively large peak assignable to low weight components; that a marketed high-ammonia latex has a molecular weight distribution wherein a peak assignable to the low molecular weight part is reduced or lost; and that the former latex contains little gel components and has a low green strength while the latter latex contains a large amount of gel components and has a high green strength. It has been further found that deproteinized natural rubbers, each being almost free from gel component and substantially contains no protein, can be produced by the process for producing the deproteinized natural rubber according to the present invention, as discussed above, by using a field latex containing a small amount of ammonia. and a marketed high-ammonia latex, though the differences between these deproteinized natural rubbers in the green strength and molecular weight distribution remain unchanged, which suggests that the gel components never participate therein. Based on the facts that the high-ammonia latex has a molecular weight distribution showing a small peak due to the low molecular weight components and that when ammonia is added to the field latex and the mixture is aged, the peak due to the low molecular weight part is lost and the green strength is simultaneously elevated, it is clearly indicated that ammonia accelerates the binding and branching of rubber molecules, though the mechanism therefor has never been clarified so far. It is also expected that a deproteinized natural rubber containing little gel components would have improved mechanical properties such as tear resistance.

It is confirmed that ammonia cannot exert any effect to elevate the green strength unless it is added after the deproteinizing, i.e., refining step. A higher ammonia concentration can give the more improved green strength. When the ammonia concentration is less than 0.2% by weight, no effect can be achieved in practice. The ammonia concentration is preferably at least 0.5% by weight. The upper limit of the ammonia concentration is not particularly restricted and it is to be determined based on economical factors.

After adding ammonia, the natural rubber latex is aged simply by allowing to stand. A longer standing period gives the more improved green strength. More particularly, the natural rubber latex may be allowed to stand for 5 to 30 days, when the aging is to be performed at room temperature. The improvement in the green strength can be further promoted by aging the natural rubber latex at an elevated temperature.

After the completion of the aging, the natural rubber latex is refined to thereby reduce the protein content. The refining may be carried out by the various methods for reducing the protein contents as cited above. Among these methods, preferable examples include a method comprising reducing the protein content via decomposition of the proteins with the use of proteases or bacteria and another method comprising using surfactants such as soaps. It is more preferable to simultaneously or successively treat the natural rubber latex with a protease and surfactant(s), namely, as done in the process for producing the deproteinized natural rubber according to the present invention. After the completion of the treatment, the latex is subjected to separation to thereby separate rubber particles (the rubber components).

As will be described in the following Examples, the deproteinized natural rubber thus obtained has a green strength of at least 1 MPa which is extremely improved as compared with conventional deproteinized rubbers.

Namely, the deproteinized natural rubber having an elevated green strength according to the present invention is excellent in processing characteristics in kneading, sheeting, various molding and the like as compared to conventional natural rubber.

On the other hand, a natural rubber having a lowered green strength can be obtained by refining a field latex, i.e., a latex to which ammonia has not been added or which has not underwent aging after addition of ammonia, to thereby reduce the protein content of the latex. To lower the green strength of the natural rubber efficiently, it is preferable to use a field latex fresh from the rubber trees. When ammonia has been added to the latex in an amount of 0.2% by weight or less, the latex may be subjected to refining within about one month to obtain a natural rubber having a lowered green strength since such a law concentration of ammonia hardly cause increase in the green strength of the natural rubber. When ammonia has been added to the latex in an amount of more than 0.2% by weight, it is desirable to subject the latex to refining as soon as possible. In particular, when ammonia is added to the latex in an amount of 0.5% by weight or more, it is desirable to subject the latex to refining within 72 hours from the addition of ammonia. Further, it is preferable to store the latex at room temperature or below because storage of the latex at a high temperature may cause increase in the green strength of the resulting natural rubber. The refining of the latex may be carried out in the same way as employed to obtain a natural rubber having an elevated green strength.

The deproteinized natural rubber having a lowered green strength thus obtained has a superior fluidity, so that it is excellent in processing characteristics in an injection molding process or the like as compared to conventional natural rubbers.

The natural rubber according to the present invention from which the protein have been eliminated at a high level may be applied for products of various fields such as contraceptive appliances, medical equipments, rubber threads, solid rubber products, sporting equipments, automobile tires.

The deproteinized natural rubber according to the present invention can be blended with other components commonly employed in conventional rubber compositions and thus used as a rubber composition.

Examples of such components for preparing a rubber composition include conventional synthetic rubbers; vulcanizing agents or crosslinking agents such as sulfur, organic sulfur compounds, organic peroxides and metal oxides; vulcanizing accelerators such as aldehyde/amines, dithiocarbamates, guanidines, thiazoles and thiurams; vulcanizing acceleration aids such as metal oxides and fatty acids; various aging inhibitors; reinforcing agents such as carbon black and white carbon; fillers; tack developers; plasticizers; softeners; colorants; and lubricants. These components can be blended at the optimum ratio for each rubber product in a conventional manner.

To further illustrate the present invention in greater detail, the following Examples will be given.

EXAMPLE 1

Alkalase 2.0 M (1.5 APU) (manufactured by Novo Nordisk Bioindustry) was used as a protease and a natural rubber latex of a solid content of 60.2% (manufactured by Soctek Sendirian Berhad, Malaysia) was used as a natural rubber latex.

15 ml of the natural rubber latex was diluted with 200 ml of distilled water and stabilized with 0.12% of sodium naphthenate. Then it was adjusted to pH 9.2 by adding sodium dihydrogen phosphate. 0.78 g of Alkalase 2.0 M was dispersed in 10 ml of distilled water and then added to the above-mentioned diluted natural rubber latex. After adjusting the pH value to 9.2 again, the latex was maintained at 37° C. for 24 hours. After the completion of the enzymatic treatment, a nonionic surfactant, Triton X-100 (manufactured by Toho Chemical Industry Co., Ltd.) was added to the latex at a concentration of 1%, followed by centrifuging the latex at 11,000 rpm for 30 minutes. The creamy fraction thus formed was dispersed again in 200 ml of distilled water containing 1% of Triton X-100 and then centrifuged again. This procedure, i.e., the procedure comprising centrifugation and dispersing of the creamy fraction into distilled water, was repeated thrice. Next, calcium chloride was added to the dispersion of the cream to thereby separate a solid rubber.

The solid rubber thus separated was dried in vacuo and extracted with acetone for 16 hours. Subsequently, it was dissolved in toluene at a concentration of 1% and then centrifuged at 11,000 rpm for 30 minutes. The transparent rubber solution thus formed was separated and precipitated from an excess volume of methanol. The solid rubber thus obtained was dried in vacuo at room temperature.

COMPARATIVE EXAMPLE 1

A natural rubber latex was diluted 15-fold with distilled water and stabilized with 1% of Triton X-100. This diluted latex was centrifuged at 11,000 rpm for 30 minutes. The creamy fraction thus formed was dispersed again in the same amount of distilled water containing 1% of Triton X-100 and centrifuged again. This procedure was repeated thrice. Then calcium chloride was added to the dispersion of the cream thus obtained to thereby separate a solid rubber. The solid rubber thus separated was treated in the same manner as the one described in Example 1.

COMPARATIVE EXAMPLE 2

A natural rubber latex was diluted 5-fold with distilled water and 1% of formic acid was added thereto to thereby separate a solid rubber. The solid rubber thus separated was treated in the same manner as the one described in Example 1.

The nitrogen contents of these solid rubbers were analyzed by the RRIM test method (Rubber Research Institute of Malaysia (1973), 'SMR Bulletin No. 7'). Regarding infrared absorption spectra, a film of each solid rubber was formed on a KBr disk and the absorbance was determined with a Fourier transformation infrared spectrometer JASCO 5300.

Table 1 shows the results of the analysis. The nitrogen content of the sample of Example 1 was less than 0.01%. As FIG. 1 clearly shows, the infrared absorption spectrum of this sample shows an absorption at 3320 cm$^{-1}$ assignable to short-chain peptides or amino acids but no absorption at 3280 cm$^{-1}$ assignable to high molecular weight polypeptides is detected.

Although the sample of Comparative Example was refined to a substantially high level, it contained 0.04% of nitrogen. At this level, the absorption at 3280 cm$^{-1}$ assignable to polypeptides still remains in addition to the one assignable to short-chain peptides or amino acids. Although the protein level of the sample of Comparative Example 2 was lowered by the treatment compared to marketed ones, it contained 0.16% of nitrogen and showed an extremely intense absorption due to polypeptides.

TABLE 1

(Result of the analysis on nitrogen content and infrared absorption spectrum of deproteinized natural rubber)

| Sample | Nitrogen content (%) | IR spectrum (cm$^{-1}$) |
|---|---|---|
| Example 1 | less than 0.01 | 3320 |
| Comparative Example 1 | 0.04 | 3316, 3280 |
| Comparative Example 2 | 0.16 | 3280 |

EXAMPLE 2

As a natural rubber latex, a marketed latex of high-ammonia type (manufactured by Guthrie, Malaysia) was used. The solid rubber content of the latex was 62.0%.

The above-mentioned natural rubber latex was diluted with a 0.12% aqueous solution of sodium naphthenate in such a manner as to give a solid rubber content of 10% by weight. Then the latex was adjusted to pH 9.2 by adding sodium dihydrogen phosphate and Alkalase 2.0 M was added at a ratio of 0.87 g per 10 g of rubber components. After adjusting to pH 9.2 again, the latex was maintained at 37° C. for 24 hours.

After the completion of the enzymatic treatment, a 1% aqueous solution of Triton X-100 was added to the latex to thereby adjust the rubber concentration to 8%, followed by centrifuging at 11,000 rpm for 30 minutes. The creamy fraction thus formed was dispersed in a 1% aqueous solution of Triton X-100 and the rubber concentration was adjusted to about 8%, followed by centrifuging again. The centrifugation was repeated once more and the cream thus obtained was dispersed in distilled water. Thus a deproteinized rubber latex of a solid rubber content of 60% was obtained.

The nitrogen content of a raw rubber obtained from this latex was 0.009%. In the infrared absorption spectrum thereof, an absorption was observed at 3320 cm$^{-1}$ but none was observed at 3280 cm$^{-1}$.

A raw rubber test sheet was prepared by casting 36 g of the latex onto a glass plate (18 cm×12 cm) and dried by allowing to stand at room temperature. Then it was peeled off from the glass plate and the surface contacting with the glass plate was dried over day. Subsequently, it was dried in vacuo to thereby give a test sample.

A vulcanized rubber test sheet was prepared by adjusting the solid rubber content of the latex to 50%, blending the components as listed in the following Table 2, allowing the obtained composition to stand for 48 hours and then treating it in the same manner as the one described above. After vulcanizing by heating in an oven at 100° C. for 30 minutes, a test sample was obtained.

For comparison, similar samples were prepared from the unrefined latex.

TABLE 2

(Composition of latex for vulcanized rubber)

| | Content (part by weight) | |
|---|---|---|
| Component | Dry basis | Liquid basis |
| Latex (solid content: 50%) | 100 | 200 |
| Milk casein (10% aqueous solution) | 0.1 | 1 |
| Dispersion-1* | — | 5 |
| ZnO | 1 | — |
| Sulfur | 1 | — |
| Zinc dibutyl dithiocarbamate | 0.5 | — |
| Solid content (%) | (100) | 49.8 |

*Dispersion-1 is a dispersion containing 20% by weight of ZnO, 20% by weight of sulfur and 10% by weight of zinc dibutyl dithiocarbamate.

Regarding the mechanical strengths of the obtained raw rubber sheet and vulcanized rubber sheet, the tensile strength, elongation at break and modules were measured by using a JIS No. 4 dumbbell at a test speed of 500 mm/min. The results are as follows. Figures given in parentheses mean the data of the comparative samples.

(1) Raw rubber sheet

Tensile strength: 7.18 MPa (7.85)

Elongation at break: 1,180% (1160)

500% modules: 0.45 MPa (0.52)

(2) Vulcanized rubber sheet

Tensile strength: 23.7 MPa (24.3)

Elongation at break: 840% (850)

500% modules: 2.66 MPa (2.68)

Tear strength: 101.6 kN/m (90.9)

The raw rubber was excellent in transparent and colorless appearance. Further, it had an improved water absorptivity of 0.87% (comparative sample: 6.74%) and a high electrical insulation property (surface resistance: 6.6×10$^{12}$ Ω (comparative sample: 2.7×10$^{10}$ Ω), volume resistance: 6.9×10$^{15}$ Ω·m (comparative sample: 2.0×10$^{14}$ Ω·m)).

Figure 2:
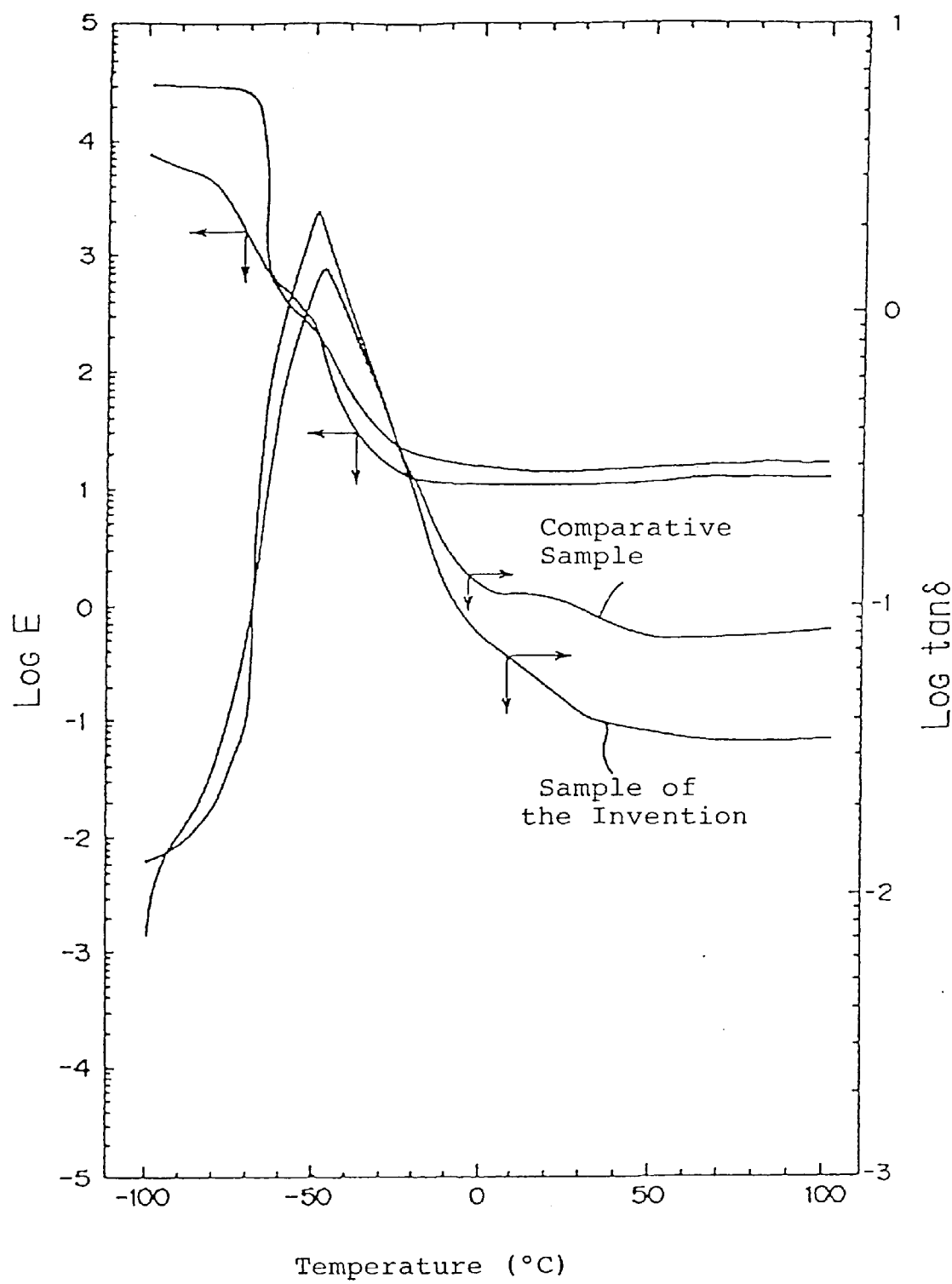
FIG. 2 is a graph which shows the viscoelasticity spectra of the vulcanized samples prepared in Example 2.

FIG. 2 shows the viscoelasticity spectra of the vulcanized samples in this Example. Although the tan δ peaks do not largely differ from each other in location and size, the tan δ of the sample of the Example is obviously lowered within a temperature range of −20° C. or above, which indicates that this sample is a material suffering from little energy loss within the practically usable range. Further, Table 3 shows the results of a storage hardening acceleration test on raw rubbers.

A test sample for Wallace's plasticity test was prepared by laminating two raw rubber sample films and stamping with a special purpose stamping unit. Then the Wallace's.plasticity was measured by a conventional method and referred to as the initial plasticity.

Subsequently, the sample was introduced into a container containing a 4A molecular sieve and allowed to stand at 60° C. for 24 hours, followed by measuring the plasticity. The difference between these plasticities was employed as the guide to the storage hardening.

TABLE 3

(Result of storage hardening acceleration test on deproteinized natural rubber)

| Sample | Initial plasticity (P) | Plasticity after heating (P*) | dP (P* - P) |
|---|---|---|---|
| Example | 57 | 60 | 3 |
| Comparative Example | 56 | 93 | 37 |

Table 3 indicates that the sample of the Example scarcely underwent hardening.

EXAMPLES 3 TO 8

A high-ammonia natural rubber latex was diluted so as to give a rubber content of 30% and adjusted to pH 9 with $H_3PO_4$. Then 1%, in terms of the effective components, of each composition for treating the latex as listed in Table 4 was added thereto. After allowing to stand at 30° C. for 24 hours, the latex was centrifuged at 13,000 rpm for 30 minutes. The upper creamy layer thus separated out was collected and dispersed again in the same amount of water. When the centrifugation was repeated twice or thrice, the creamy layer was washed with a 1% solution of surfactants (free from any protease) after the completion of the first centrifugation and then centrifuged at 13,000 rpm for 30 minutes, followed by repeating the same procedure as the one described above, i.e., the procedure comprising centrifugation and washing of the creamy layer with the 1% solution of the surfactants. Then it was poured into methanol containing a small amount of $CaCl_2$ to thereby precipitate the rubber which was then dried under reduced pressure overnight. Next, the nitrogen content was determined by the Kjeldahl method and referred to as the content of the remaining proteins. The precision of the measurement was ±0.0001%.

TABLE 4

| Component | Amount (part by weight[*1]) |
|---|---|
| Example 3 | |
| Alkaline protease (11.1 APU) | 2 |
| Sodium laurate | 60 |
| Polyoxyethylene (10 mole) octylphenyl ether (Emulgen 810[*2]) | 38 |
| Example 4 | |
| Alkaline protease (11.1 APU) | 2 |
| Sodium dodecylbenzenesulfonate (Neopelex F-25[*2]) | 60 |
| Polyoxyethylene (9 mole) lauryl ether (Emulgen 109P[*2]) | 38 |
| Example 5 | |
| Alkaline protease (11.1 APU) | 2 |
| Polyoxyethylene (3 mole) lauryl sulfate (Emal 20C[*2]) | 60 |
| Polyoxyethylene (10 mole) oleyl ether (Emanon 4110[*2]) | 38 |
| Example 6 | |
| Alkaline protease (11.1 APU) | 2 |
| Sodium laurate | 45 |
| Polyoxyethylene (20 mole) sorbitan oleate (Rheodol TW-O-120[*2]) | 53 |
| Example 7 | |
| Protease (Bacillus sp.) (3.0 APU) | 2 |
| Sodium dodecylbenzenesulfonate | 20 |
| Sodium alkylnaphthalenesulfonate | 25 |
| Sucrose palmitate | 53 |
| Example 8 | |
| Alkaline protease (11.1 APU) | 2 |
| Sodium rosinate | 55 |
| Polyoxyethylene (9 mole) nonyl phenyl ether (Emulgen 909[*2]) | 45 |

[*1]Parts by weight are of the specified enzyme or surfactant.
[*2]A trade name of a product manufactured by Kao Corporation which contains the specified surfactant.

COMPARATIVE EXAMPLES 3 TO 6

The procedures of the above Examples 3 to 8 were repeated except that the composition for treating the latex as listed in Table 5 were employed. Thus the contents of the remaining proteins were determined.

TABLE 5

| Component | Amount (part by weight[*1]) |
|---|---|
| Comparative Example 3 | |
| Sodium laurate | 55 |
| Polyoxyethylene (9 mole) nonylphenyl ether (Emulgen 909[*2]) | 45 |
| Comparative Example 4 | |
| Alkaline protease (11.1 APU) | 2 |
| Polyoxyethylene (3 mole) nonylphenyl ether (Emulgen 903[*2]) | 98 |
| Comparative Example 5 | |
| Alkaline protease (11.1 APU) | 2 |
| ion-exchanged water | 98 |
| Comparative Example 6 | |
| polyoxyethylene (10 mole) octylphenyl ether (Emulgen 810[*2]) | 100 |

[*1]Parts by weight are of the specified enzyme or surfactant.
[*2]A trade name of a product manufactured by Kao Corporation which contains the specified surfactant.

Table 6 summarizes the treating conditions and test results. In Table 6, the expression "distilled water" means the nitrogen content of a blank case where the latex was treated exclusively with distilled water. In the case of Example 4, the nitrogen contents of the samples centrifuged and washed once and twice are given.

TABLE 6

| | Treating concentration (%) | Number of centrifugation and washing (times) | Nitrogen content (%) |
|---|---|---|---|
| Example 3 | 1.0 | 1 | 0.011 |
| Example 4 | 1.0 | 1 | 0.012 |
| Example 4 | 1.0 | 2 | 0.008 |
| Example 5 | 1.0 | 2 | 0.008 |
| Example 6 | 1.0 | 2 | 0.008 |
| Example 7 | 1.0 | 1 | 0.015 |
| Example 8 | 1.0 | 1 | 0.014 |
| Comparative Example 3 | 1.0 | 1 | 0.940 |
| Comparative Example 4 | 1.0 | 2 | 0.043 |
| Comparative Example 5 | 1.0 | 3 | 0.060 |
| Comparative Example 6 | 1.0 | 3 | 0.054 |
| Distilled water | — | 3 | 0.090 |

As Table 6 shows, proteins can be efficiently and easily eliminated from natural rubber by treating a natural rubber latex with the deproteinizing process of the present invention.

EXAMPLES 9 TO 12

A high-ammonia latex of natural rubber was diluted so as to give a rubber content of 30% and adjusted to pH 9 with $H_3PO_4$. Then 1%, in terms of the effective components, of each composition for treating the latex as listed in Table 7 was added thereto. After allowing to stand at 30° C. for 24 hours, the latex was centrifuged at 13,000 rpm for 30 minutes. The upper creamy layer thus separated out was collected and dispersed again in the same amount of water. When the centrifugation was repeated twice or thrice, the creamy layer was washed with a 1% solution of surfactants (free from any protease) after the completion of the first centrifugation and then centrifuged at 13,000 rpm for 30 minutes, followed by repeating the same procedure as the one described above, i.e., the procedure comprising centrifugation and washing of the creamy layer with the 1% solution of the surfactants. Then it was poured into methanol containing a small amount of $CaCl_2$ to thereby precipitate the rubber which was then dried under reduced pressure overnight. Next, the nitrogen content was determined by the Kjeldahl method and referred to as the content of the remaining proteins. The precision of the measurement was ±0.0001%.

TABLE 7

| Component | Amount (part by weight[*1]) |
|---|---|
| Example 9 | |
| Alkaline protease (11.1 APU) | 2 |
| Sodium polyoxyethylene (4) nonylphenyl ether sulfate (Emal NC[*2]) | 98 |
| Example 10 | |
| Alkaline protease (11.1 APU) | 2 |
| Sodium dodecylbenzenesulfonate (Neopelex F-25[*2]) | 98 |

TABLE 7-continued

| Component | Amount (part by weight[*1]) |
|---|---|
| Example 11 | |
| Alkaline protease (11.1 APU) | 2 |
| Polyoxyethylene (3 mole) lauryl sulfate (Emal 20C[*2]) | 98 |
| Example 12 | |
| Protease (Bacillus sp.) (3.0 APU) | 2 |
| Sodium laurylphosphate | 98 |

[*1]Parts by weight are of the specified enzyme or surfactant.
[*2]A trade name of a product manufactured by Kao Corporation which contains the specified surfactant.

COMPARATIVE EXAMPLES 7 TO 10

The procedures of the above Examples 9 to 12 were repeated except that the composition for treating the latex as listed in Table 8 were employed. Thus the contents of the remaining proteins were determined.

TABLE 8

| Component | Amount (part by weight[*1]) |
|---|---|
| Comparative Example 7 | |
| Alkaline protease (11.1 APU) | 2 |
| Sodium laurate | 98 |
| Comparative Example 8 | |
| Protease (Bacillus sp.) (3.0 APU) | 2 |
| Polyoxyethylene (3 mole) nonylphenyl ether (Emulgen 903[*2]) | 98 |
| Comparative Example 9 | |
| Sodium laurate | 100 |
| Comparative Example 10 | |
| Polyoxyethylene (10 mole) octylphenyl ether (Emulgen 810[*2]) | 100 |

[*1]Parts by weight are of the specified enzyme or surfactant.
[*2]A trade name of a product manufactured by Kao Corporation which contains the specified surfactant.

Table 9 summarizes the treating conditions and test results. In Table 9, the expression "distilled water" means the nitrogen content of a blank case where the latex was treated exclusively with distilled water. In the case of Example 10, the nitrogen contents of the samples centrifuged and washed once and twice are given.

TABLE 9

| | Treating concentration (%) | Number of centrifugation and washing (times) | Nitrogen content (%) |
|---|---|---|---|
| Example 9 | 1.0 | 1 | 0.012 |
| Example 10 | 1.0 | 1 | 0.013 |
| Example 10 | 1.0 | 2 | 0.008 |
| Example 11 | 1.0 | 2 | 0.008 |
| Example 12 | 1.0 | 2 | 0.008 |
| Comparative Example 7 | 1.0 | 1 | 0.048 |
| Comparative Example 8 | 1.0 | 2 | 0.043 |
| Comparative Example 9 | 1.0 | 3 | 0.062 |
| Comparative Example 10 | 1.0 | 3 | 0.054 |
| Distilled water | — | 3 | 0.090 |

As Table 9 shows, proteins can be efficiently and easily eliminated from natural rubber by treating a natural rubber latex with the deproteinizing process of the present invention.

EXAMPLES 13 TO 17

A high-ammonia latex of natural rubber was diluted so as to give a rubber content of 30% and adjusted to pH 9 with $H_3PO_4$. Then 1% by weight, in terms of the effective components, of each composition for treating the latex as listed in Table 10 was added thereto. After allowing to stand at 30° C. for 24 hours, the latex was centrifuged at 13,000 rpm for 30 minutes. The upper creamy layer thus separated out was collected and dispersed again in the same amount of water. When the centrifugation was repeated twice or thrice, the creamy layer was washed with a 1% solution of surfactants (free from any protease) after the completion of the first centrifugation and then centrifuged at 13,000 rpm for 30 minutes, followed by repeating the same procedure as the one described above, i.e., the procedure comprising centrifugation and washing of the creamy layer with the 1% solution of the surfactants. Then it was poured into methanol containing a small amount of $CaCl_2$ to thereby precipitate the rubber which was then dried under reduced pressure overnight. Next, the nitrogen content was determined by the Kjeldahl method and referred to as the content of the remaining proteins. The precision of the measurement was ±0.0001%.

TABLE 10

| Component | Amount (part by weight[*1]) |
|---|---|
| Example 13 | |
| Alkaline protease (11.1 APU) | 2 |
| Polyoxyethylene (10 mole) oleyl ester (Emanon 4110[*2]) | 98 |
| Example 14 | |
| Alkaline protease (11.1 APU) | 2 |
| Polyoxyethylene (20 mole) sorbitan oleyl ester (Rheodol TW-0120[*2]) | 98 |

TABLE 10-continued

| Component | Amount (part by weight[*1]) |
|---|---|
| Example 15 | |
| Protease (Bacillus sp.) (3.0 APU) | 2 |
| Polyglycerol (6 mole) oleyl ester | 98 |
| Example 16 | |
| Protease (Bacillus sp.) (3.0 APU) | 2 |
| Lauryl maltoside | 98 |
| Example 17 | |
| Protease (Bacillus sp.) (3.0 APU) | 2 |
| Polyoxyethylene (10 mole) oleyl ester (Emanon 4110[*2]) | 43 |
| Polyglycerol (6 mole) oleyl ester | 55 |

[*1]Parts by weight of the specified enzyme and surfactants.
[*2]A trade name of a product manufactured by Kao Corporation which contains the specified surfactant.

COMPARATIVE EXAMPLES 11 TO 13

The procedures of the above Examples 13 to 17 were repeated except that the composition for treating the latex as listed in Table 11 were employed. Thus the contents of the remaining proteins were determined.

TABLE 11

| Component | Amount (part by weight[*1]) |
|---|---|
| Comparative Example 11 | |
| Alkaline protease (11.1 APU) | 2 |
| Sodium laurate | 98 |
| Comparative Example 12 | |
| Protease (Bacillus sp.) (3.0 APU) | 2 |
| Polyoxyethylene (3 mole) nonylphenol ether (Emulgen 903[*2]) | 98 |
| Comparative Example 13 | |
| Polyoxyethylene (10 mole) octylphenyl ether (Emulgen 810[*2]) | 100 |

[*1]Parts by weight are of the specified enzyme or surfactant.
[*2]A trade name of a product manufactured by Kao Corporation which contains the specified surfactant.

Table 12 summarizes the treating conditions and test results. In Table 12, the expression "distilled water" means the nitrogen content of a blank case where the latex was treated exclusively with distilled water. In the case of Example 14, the nitrogen contents of the samples centrifuged washed once and twice are given.

TABLE 12

| | Treating concentration (%) | Number of centrifugation and washing (times) | Nitrogen content (%) |
|---|---|---|---|
| Example 13 | 1.0 | 1 | 0.012 |
| Example 14 | 1.0 | 1 | 0.013 |
| Example 14 | 1.0 | 2 | 0.009 |
| Example 15 | 1.0 | 2 | 0.009 |
| Example 16 | 1.0 | 2 | 0.008 |
| Example 17 | 1.0 | 1 | 0.015 |
| Comparative Example 11 | 1.0 | 1 | 0.048 |
| Comparative Example 12 | 1.0 | 2 | 0.043 |
| Comparative Example 13 | 1.0 | 3 | 0.054 |
| Distilled water | — | 3 | 0.090 |

As Table 12 shows, proteins can be efficiently and easily eliminated from natural rubber by treating a natural rubber latex with the deproteinizing process of the present invention.

EXAMPLE 18

1500 g of a marketed high-ammonia natural rubber latex (rubber content: 60%) was diluted by adding 1500 g of pure water. Then 0.6 g of a protease and 30 g of an anionic surfactant/nonionic surfactant mixture were added thereto and proteins were decomposed at 30° C. for 24 hours. Subsequently, this latex was centrifuged twice to thereby concentrate the rubber components which was then air-dried, thus giving a solid rubber. The total nitrogen content in this solid rubber determined by the Kjeldahl method was 0.010%. This rubber was dissolved by toluene and the absorbance was measured by the transmission method with the use of a Fourier transform infrared spectrometer (manufactured by Perkin-Elmer). As a result, no absorption was observed at 3280 $cm^{-1}$, even though the chart was highly enlarged. The Mooney viscosity ($ML_{1+4}$) of this raw rubber at 130° C. was 52.5. Composition:

| Component | Amount (part by weight) |
|---|---|
| Rubber | 100 |
| Carbon ISAF | 50 |
| Zinc white | 3 |
| Stearic acid | 3 |
| Anti-aging agent | 2 |
| Sulfur | 1.5 |
| Vulcanization accelerator NS | 0.8 |

By using the above-mentioned deproteinized natural rubber, the composition as specified above was kneaded in a Banbury mixer. During the starting one minute, the rubber alone was kneaded. Then the components of from Carbon ISAF to the anti-aging agent given in the above list were added, followed by kneading for 3 minutes. After weighing the obtained rubber composition, sulfur and the vulcanization accelerator were added thereto on a roll. Although 1239 g of the components were added in total, the kneaded composition suffered from a weight loss of only less than 2 g.

Table 14 shows the result of the measurement of the viscosity of this unvulcanized rubber composition determined with the use of a Mooney viscometer. The determination was performed at 130° C.

This rubber was press-vulcanized at 140° C. for 20 minutes. Table 15 shows the physicochemical properties of the thus obtained product before and after aging at 100° C. for 48 hours. The physicochemical properties were measured in normal condition (temperature: 23° C.; humidity: 55%).

COMPARATIVE EXAMPLE 14

The procedure of Example 18 was repeated except that a dried high-ammonia natural rubber latex was used as a rubber. This rubber showed a large absorption at 3280 $cm^{-1}$ and had a Mooney viscosity ($ML_{1+4}$ (130° C.)) of 104.8. The weight loss due to kneading of the same amount of the rubber as the one described in Example 18 was about 10 g.

COMPARATIVE EXAMPLE 15

The procedure of Example 18 was repeated except that a pale crepe was used as a rubber. This rubber showed a large absorption at 3280 $cm^{-1}$ and had a Mooney viscosity ($ML_{1+4}$ (130° C.)) of 85.7. The weight loss due to kneading of the same amount of the rubber as the one described in Example 18 was about 10 g.

COMPARATIVE EXAMPLE 16

The procedure of Example 18 was repeated except that a standard Malaysia rubber of constant viscosity (SMR-CV) was used as a rubber. This rubber showed a large absorption at 3280 $cm^{-1}$ and had a Mooney viscosity ($ML_{1+4}$ (130° C.)) of 56.3. The weight loss due to kneading of the same amount of the rubber as the one described in Example 18 was about 10 g.

COMPARATIVE EXAMPLE 17

The procedure of Example 18 was repeated except that a rubber, which had been prepared by adding a loosening agent to rubber RSS No. 3 and masticating in advance, was used as a rubber. This rubber showed a large absorption at 3280 $cm^{-1}$ and had a Mooney viscosity ($ML_{1+4}$ (130° C.)) of 59.2. The weight loss due to kneading of the same amount of the rubber as the one described in Example 18 was about 3 g.

TABLE 13

(Physicochemical properties of raw rubber)

| | Example | Comparative Example | | | |
|---|---|---|---|---|---|
| | 18 | 14 | 15 | 16 | 17 |
| Nitrogen content | 0.010 | 0.30 | 0.46 | 0.42 | 0.46 |
| Mooney viscosity ($ML_{1+4}$ (130° C.)) | 52.5 | 104.8 | 85.7 | 56.3 | 59.2 |

TABLE 14

(Physicochemical properties of unvulcanized rubber)

| | Example | Comparative Example | | | |
|---|---|---|---|---|---|
| | 18 | 14 | 15 | 16 | 17 |
| Mooney viscosity ($ML_{1+4}$ (130° C.)) | 51.9 | 65.7 | 61.0 | 60.2 | 56.5 |
| Scorch time: $T_5$ (min.) | 16.2 | 14.7 | 19.2 | 19.2 | 18.3 |

TABLE 14-continued (Physicochemical properties of unvulcanized rubber)

| | Example | Comparative Example | | | |
|---|---|---|---|---|---|
| | 18 | 14 | 15 | 16 | 17 |
| $T_{10}$ (min.) | 17.1 | 16.0 | 20.1 | 20.6 | 19.2 |
| $T_{90}$ (min.) | 19.7 | 19.0 | 22.9 | 23.9 | 21.7 |

TABLE 15

(Physicochemical properties of vulcanized rubber)

| | Example | Comparative Example | | | |
|---|---|---|---|---|---|
| | 18 | 14 | 15 | 16 | 17 |
| Before aging: | | | | | |
| $T_B$ (MPa) | 32.9 | 30.0 | 28.0 | 26.6 | 28.3 |
| $E_B$ (%) | 664 | 651 | 671 | 674 | 629 |
| $H_S$ (hardness) | 60 | 61 | 59 | 59 | 61 |
| $T_R$ (kN/m) | 74.2 | 70.5 | 66.7 | 65.1 | 63.7 |
| After aging at 100° C. for 48 hours: | | | | | |
| $T_B$ (MPa) | 26.8 | 24.9 | 25.6 | 25.9 | 25.8 |
| $E_B$ (%) | 446 | 418 | 417 | 429 | 393 |
| $H_S$ (hardness) | 64 | 68 | 70 | 70 | 71 |

$T_B$ measured in the manner according to JIS K 6301
$E_B$ measured in the manner according to JIS K 6301
$H_S$ measured by means of Shore A breaking hardness meter
$T_R$ strength (N) at breakage (measured by B-type tearing tester specified in JIS K 6301) per the width (m) of the sample.

EXAMPLE 19

Alkalase 2.0 M (manufactured by Novo Nordisk Bioindustry) and a field latex immediately after tapping (obtained from Guthrie, Malaysia) were obtained respectively as a protease and as a natural rubber latex. The total solid content of this latex was 38.4% while its rubber content was 33.0%.

Aqueous ammonia was added to the above-mentioned field latex to thereby give an ammonia concentration of 1%, followed by allowing to stand at 30° C. for 2 days. Then the latex was diluted by adding a 0.12% aqueous solution of sodium naphthenate so as to give a solid rubber content of 10% by weight. Further, sodium dihydrogen phosphate was added to thereby adjust the latex to pH 9.2. Alkalase 2.0 M was added at a ratio of 0.87 g per 10 g of the rubber content. The pH value of the latex was adjusted to 9.2 again and then it was maintained at 37° C. for 24 hours.

After the completion of the enzymatic treatment, a 1% aqueous solution of a nonionic surfactant Triton X-100 (manufactured by Toho Chemical Industry Co., Ltd.) was added to the latex and thus the rubber concentration was adjusted to 8%, followed by centrifuging at 11,000 rpm for 30 minutes. The creamy fraction thus formed was dispersed in a 1% aqueous solution of Triton X-100 and the rubber concentration was adjusted to about 8%, followed by centrifuging again. The centrifugation was repeated once more and the cream thus obtained was dispersed in distilled water. Thus a deproteinized rubber latex of a solid rubber content of 60% was prepared.

COMPARATIVE EXAMPLE 18

In the procedure of Example 19, the field latex immediately after tapping was adjusted to a rubber concentration of 8% immediately after obtaining by adding a 1% aqueous solution of a nonionic surfactant Triton X-100 and then centrifuged at 11,000 rpm for 30 minutes. The cream thus formed was dispersed in distilled water. Thus a deproteinized natural rubber latex of a solid rubber content of 60% was prepared.

COMPARATIVE EXAMPLE 19

The creamy fraction described in Comparative Example 18 was dispersed in a 1% aqueous solution of Triton x-100, adjusted to a rubber concentration of about 6% and then centrifuged again. After repeating centrifugation for additional three times, the obtained cream was dispersed in distilled water. Thus a deproteinized natural rubber of a solid rubber content of 60% was prepared.

EXAMPLE 20

The procedure of Example 19 was repeated except that the field latex employed in Example 19 was replaced by the latex obtained in Comparative Example 16. Thus a deproteinized rubber latex was prepared.

EXAMPLE 21

The procedure of Example 19 was repeated except that the field latex was subjected to the enzymatic treatment and the subsequent procedures immediately after obtaining.

EXAMPLE 22

As a natural rubber latex, a fresh-refined latex, which had been prepared by adding 0.5% of ammonia to a field latex (obtained from Felda, Malaysia) and centrifuged, was employed. The ammonia concentration was lowered to about 0.2% and the rubber content was 60.4%. After elevating the ammonia concentration to 0.7%, the latex was allowed to stand at 30° C. for 7 days and for 14 days. Then each latex was treated in the same manner as the one described in Example 19 to thereby give a deproteinized rubber latex.

COMPARATIVE EXAMPLE 20

The refined latex employed in Example 22 was immediately treated in the same manner as the one described in Comparative Example 18 without adjusting the ammonia concentration. Thus a deproteinized natural rubber latex was prepared.

EXAMPLE 23

By using a marketed high-ammonia latex (obtained from Guthrie, Malaysia) as a natural rubber latex, the enzymatic treatment and the following procedures described in Example 19 were performed. Thus a deproteinized natural rubber latex was prepared.

A raw rubber test film was prepared by casting 36 g of each latex obtained in the above Examples or Comparative Examples onto a glass plate (18 cm×12 cm) and dried by allowing to stand at room temperature. Then it was peeled off from the glass plate and the surface contacting with the glass plate was dried over one day, followed by drying in vacuo.

The green strength of the raw rubber sheet, i.e., the test sample, was measured by using a JIS NO. 4 dumbbell at a test speed of 500 mm/min.

The nitrogen content was analyzed by the Kjeldahl method in accordance with the RRIM method.

The gel content was determined by cutting 0.5 g of the sample into small pieces, adding the pieces to 100 ml of tetarhydrofuran saturated with nitrogen, allowing it to stand in the dark 30° C. for 14 days, then centrifuging it at 12,000 rpm for 15 minutes, drying the gel thus separated and then weighing the same.

The green strength, nitrogen content and gel content of each sample are given in the following Table.

TABLE 16

| Sample | Green strength (MPa) | N content (%) | Gel content (%) |
| --- | --- | --- | --- |
| Example 19 | 1.4 | 0.01 or lower | 2.0 |
| Comparative Example 18 | 0.8 | 0.09 | 9.5 |
| Comparative Example 19 | 0.7 | 0.03 | 6.7 |
| Example 20 | 0.8 | 0.01 | 2.2 |
| Example 21 | 0.7 | 0.01 or lower | 1.9 |
| Example 22 | | | |
| (1 week) | 1.5 | 0.01 or lower | 2.1 |
| (2 weeks) | 3.4 | 0.01 or lower | 2.3 |
| Comparative Example 20 | 0.3 | 0.08 | 8.3 |
| Example 23 | 7.3 | 0.01 or lower | 2.2 |

Figure 3:
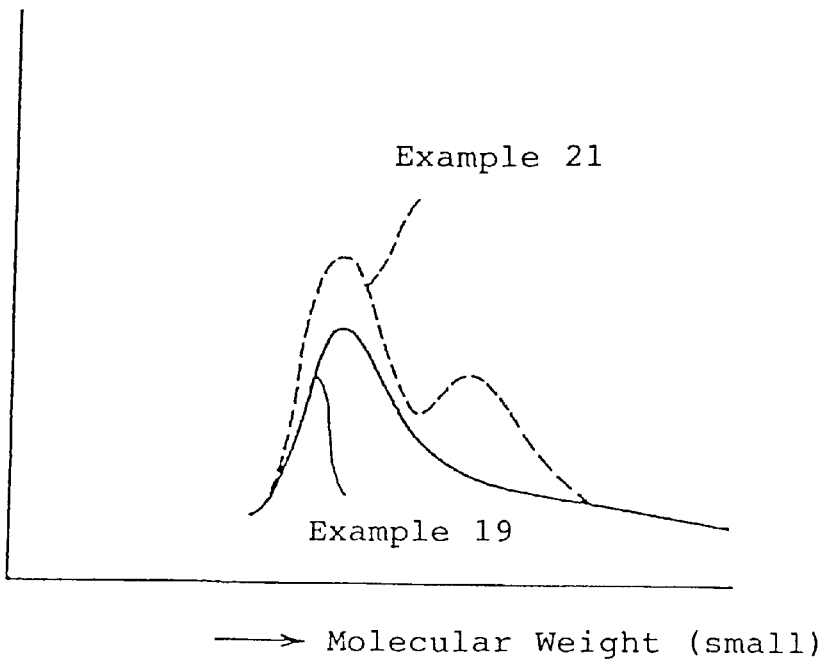
FIG. 3 is a graph which shows the results of the examination on the samples of Examples 17 and 21 by gel permeation chromatography.
Figure 4:
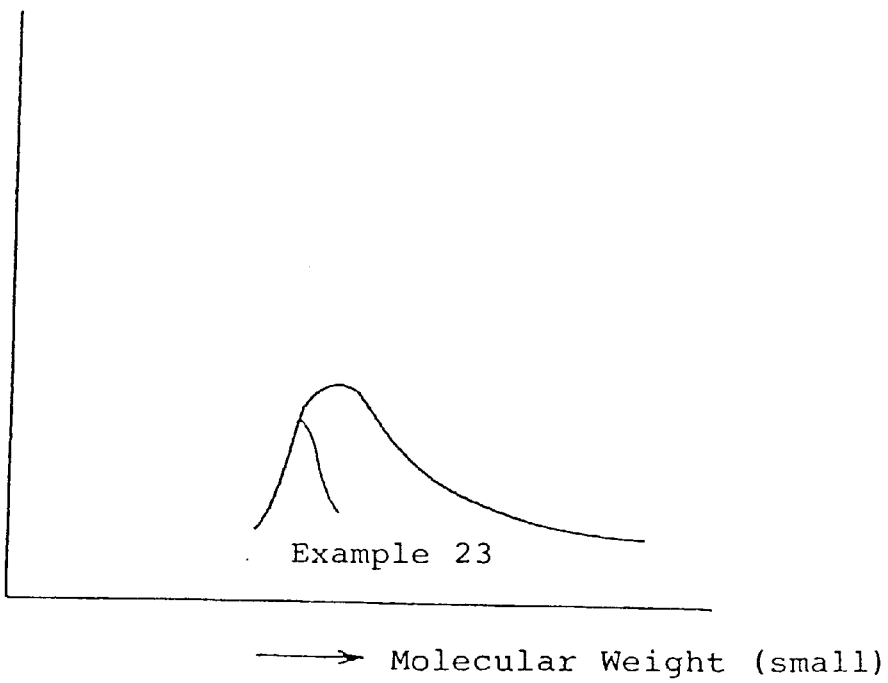
FIG. 4 is a graph which shows the result of the examination on the sample of Example 23 by gel permeation chromatography.

Further, the results of the gel permeation chromatography of the samples of Example 19 and Example 21 are shown in FIG. 3, and that of the sample of Example 23 is shown in FIG. 4.

The molecular weight of the low molecular weight region is about 150,000 while that of the high molecular weight region is about 2,500,000. The sample of Example 21 to which no ammonia was added shows a clear peak in the low molecular weight region.

As described above, the process according to the present invention makes it possible to efficiently and easily eliminate proteins contained in natural rubber and to thus easily produce a deproteinized natural rubber which is useful as a countermeasure for allergic reactions and has stable qualities.

Further, the process for producing the deproteinized natural rubber according to the present invention can be easily carried out and give a high productivity.

Furthermore, the deproteinized natural rubber of the present invention, from which proteins contained in the natural rubber latex have been eliminated to a nitrogen content level of less than 0.02 or the proteins contained in the raw rubber obtained from the natural rubber latex have been eliminated to such a level that it does not give an absorption at 3280 $cm^{-1}$ in the infrared absorption spectrum, which is characteristic to polypeptides, when measured in the form of a raw rubber film. Accordingly, it is useful as a countermeasure to the allergic reactions. Compared with conventional natural rubber, furthermore, the deproteinized natural rubber of the present invention has an improved water absorptivity, a high electrical inculcation property, excellent processing characteristics and good mechanical properties and suffers from little energy loss and no lot-to-lot variation characteristic to natural materials, which makes it a material being excellent in accuracy and qualities. In addition, since the proteins have been substantially completely eliminated, it never undergoes storage hardening. Further, it has a colorless and transparent appearance comparable to synthetic rubbers.

As the above-mentioned Examples show, furthermore, by using the natural rubber of the present invention which is excellent in processing characteristics, a rubber having a low Mooney viscosity and good processing characteristics can be obtained without effecting mastication.

In addition, natural rubber would be hardened during storage period (i.e., storage hardening), which makes mastication for plasticizing necessary at the use. It has been found out, however, that a natural rubber from which proteins have been completely eliminated would never undergo this phenomenon.

Accordingly, the deproteinized natural rubber of the present invention has a low Mooney viscosity and excellent processing characteristics. By using this deproteinized natural rubber, therefore, a rubber composition having a low Mooney viscosity, a high strength and an improved tear resistance can be obtained. In particular, the deproteinized natural rubber of the present invention has a lower Mooney viscosity than a masticated rubber to which a loosening agent has been previously added. Thus the deproteinized natural rubber of the present invention requires no mastication, which is highly advantageous from the viewpoint of the processing. As a result, the extrusion torque can be reduced and the extrusion speed can be elevated, which brings about various advantages such that the productivity is elevated, that the burning of the rubber can be inhibited and the dust-scattering at the kneading step can be suppressed.

While the invention has been described in detail and with reference to specific examples thereof, it will be apparent to one skilled in the art that various changes and modifications can be made therein without departing from the spirit and scope thereof.

What is claimed is:

1. A process for producing a deproteinized natural rubber which comprises treating a latex with a protease, an anionic surfactant and a nonionic surfactant and separating rubber particles therefrom.

2. The process of claim 1, wherein said protease is an alkaline protease.

3. The process of claim 1, wherein said anionic surfactant is selected from the group consisting of carboxylic acid surfactants, sulfonic acid surfactants, sulfate surfactants and phosphate surfactants.

4. The process of claim 1, wherein said nonionic surfactant is selected from the group consisting of polyoxyalkylene ether surfactants, polyoxyalkylene ester surfactants, sugar fatty acid ester surfactants and alkylpolyglycoside surfactants.

5. The process of claim 1, wherein said protease is used in an amount of from 0.0001 to 20% by weight based on the latex and said anionic surfactant and said nonionic surfactant are used in a total amount of from 0.001 to 20% by weight based on the latex.

* * * * *